Dec. 2, 1941. E. M. PURDY Re. 21,966

FUEL INJECTION PUMP

Original Filed Nov. 7, 1935 4 Sheets-Sheet 1

INVENTOR
Everett M. Purdy
BY
Watson, Bristol, Johnson & Leavenworth
ATTORNEY

Dec. 2, 1941. E. M. PURDY Re. 21,966
FUEL INJECTION PUMP
Original Filed Nov. 7, 1935 4 Sheets-Sheet 2
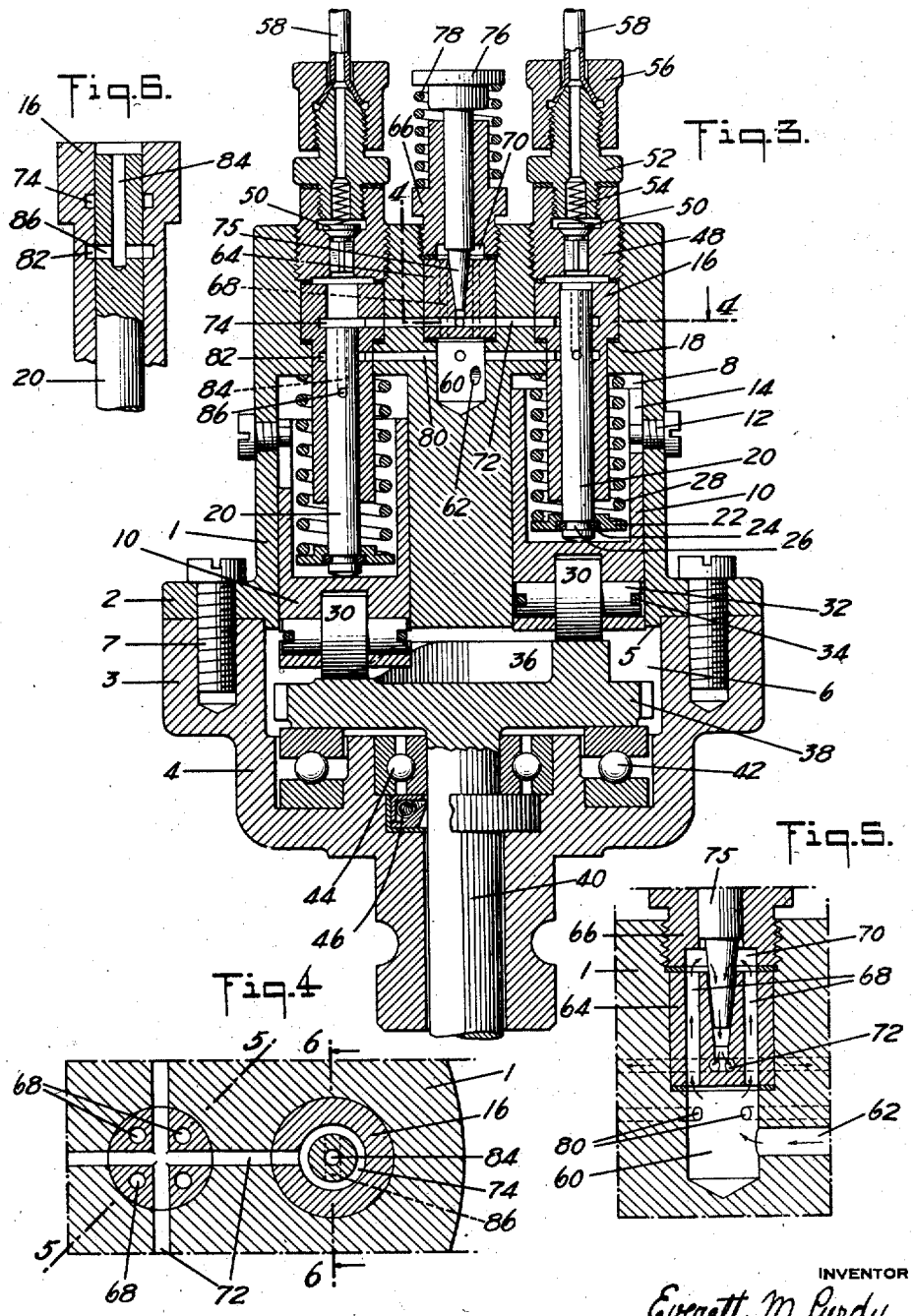
INVENTOR
Everett M. Purdy
BY
Watson, Bristol, Johnson & Leavenworth
ATTORNEY Dec. 2, 1941. E. M. PURDY Re. 21,966

FUEL INJECTION PUMP

Original Filed Nov. 7, 1935 4 Sheets-Sheet 3

INVENTOR
Everett M. Purdy
BY
Watson, Bristol, Johnson & Leavenworth
ATTORNEY

Dec. 2, 1941. E. M. PURDY Re. 21,966

FUEL INJECTION PUMP

Original Filed Nov. 7, 1935 4 Sheets-Sheet 4

INVENTOR
Everett M. Purdy
BY
Watson, Bristol, Johnson & Leavenworth
ATTORNEY

Reissued Dec. 2, 1941

Re. 21,966

UNITED STATES PATENT OFFICE 21,966

FUEL INJECTION PUMP

Everett M. Purdy, Brooklyn, N. Y., assignor to Eisemann Magneto Corporation, New York, N. Y., a corporation of New York Original No. 2,166,876, dated July 18, 1939, Serial No. 48,744, November 7, 1935. Application for reissue March 20, 1941, Serial No. 384,425

7 Claims. (Cl. 103—41)

This invention relates to fuel injection pumps for internal combustion engines and more particularly internal combustion engines firing partially or wholly by the heat of compression and it is an object of this invention to provide an improved device of the type described of simple mechanical construction and small size which shall provide for the control of the fuel to all cylinders of the engine by a single adjustable control valve equi-distant from all the pump cylinders of the device whereby improved metering and equal distribution of fuel to the various cylinders of the engine are obtained without the necessity for separate adjustments of fuel delivery to the individual engine cylinders. It is also an object of this invention to provide a fuel injection pump of such construction that the time of injection of the fuel in relation to the position of the pistons of the respective cylinders may be advanced or retarded for all cylinders simultaneously by rotating the pump casing on its mounting and in which the time at which the injection of fuel starts in each engine stroke is automatically advanced or retarded as the amount of fuel injected is increased or decreased respectively, and it is also an object of this invention to provide a fuel injection pump which may be controlled by a governor of light and sensitive construction and which is flexible in its adaptation to various conditions of installation.

In the drawings—

Fig. 3 is a view in vertical section taken as on line 3—3 of Fig. 1;

Fig. 4 is a partial view in horizontal section taken as on line 4—4 of Fig. 3;

Fig. 5 is a fragmentary view in vertical section taken as on line 5—5 of Fig. 4 and showing one form of fuel control valve and its seat;

Fig. 6 is a fragmentary view in vertical section taken as on line 6—6 of Fig. 4 and showing a fuel injection plunger and the bushing or casing in which it operates;

Figure 1:
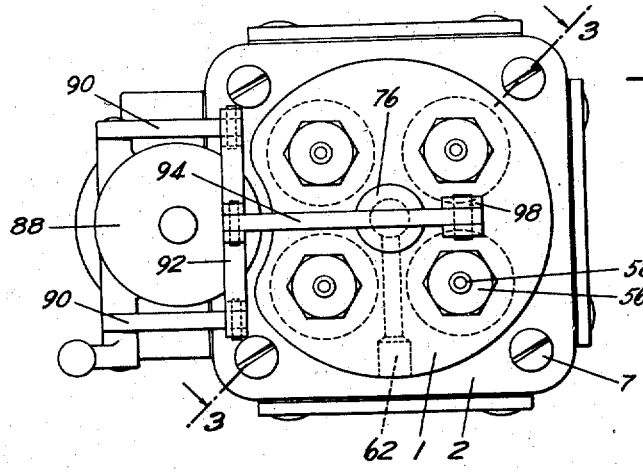
Fig. 1 is a top plan view of a fuel injection pump constructed in accordance with this invention.

As shown in the drawings, referring particularly to Figures 1 to 6 inclusive, a fuel injection pump constructed in accordance with this invention comprises a casing consisting of a substantially cylindrical portion 1 having a rectangular flange 2 at one end thereof by which it is secured to a correspondingly shaped flange 3 of a second casing portion 4. The casing portion 1 is also provided with an annular flange 5 which fits within an opening 6 of the casing portion 4. Screws 7 threaded into openings in the flange 3 secure the casing sections together. The casing section 1 is provided with a plurality of bores or cylindrical chambers 8, one for each of the cylinders of the engine with which the pump is to be used. Each of the constructions shown in the drawings are arranged for four of such chambers 8 placed with their axes spaced uniformly in a circle about the central axis of the cylindrical portion 1 of the casing. The bores 8 vary in diameter at different portions of their length and in each bore 8 there is a tubular plunger follower 10 having one end thereof closed and which is slidably mounted in that portion of the bore 8 adjacent the casing portion 4 and held against turning by a pin 12 which engages in a slot 14 formed in the side wall of the plunger follower. In each bore 8 there is also fitted a fuel plunger bushing or cylinder 16 which extends into the follower 10 and is of greater diameter at one end so as to engage with a shoulder 18 formed in the bore 8. The bushing 16 has a cylindrical opening or bore of uniform diameter throughout its length in which is slidably mounted the fuel plunger or piston 20. The plunger 20 at one end extends beyond the bushing 16 to engage the closed end of the follower 10 and its projecting end is provided with a spring seat 22 held in position by a spring wire 24 which engages in a groove 26 in the plunger. The spring seat 22 serves as a seat for a spring 28 which is confined between the spring seat and a shoulder formed in the bore 8 and which holds the end of the plunger 20 in engagement with the follower 10.

To operate the follower 10 and fuel plunger 20 the lower end of the follower 10 is recessed to receive a roller 30 mounted on a pin 32 which extends through a transverse opening in the follower 10 and is held in position by a spring wire 34 engaged in notches in the pin 32 and a groove in the follower 10. The roller 30 is positioned to be engaged by a cam 36 formed integral with a gear 38 on the end of a shaft 40 which is mounted in the casing portion 4 and arranged to be driven in suitable manner from the engine with which the pump is associated. The shaft 40 extends through a cylindrical boss 4ᵃ formed integral with the casing portion 4 and which is rotatably mounted in a bracket 41 suitably supported from the engine. A set screw 41ᵃ, threaded into the bracket 41 and engaging in a groove 4ᵇ formed in the boss 4ᵃ secures the pump casing to the bracket and permits of rotative adjustment of the casing with respect to the bracket. To provide for the free operation of the gear 38 and cam 36 the gear wheel is supported by a thrust bearing 42 and the shaft 40 is guided by a ball bearing 44, an oil seat 46 being provided between the bearings 44 and the face of the casing portion 4 in order to prevent leakage of the lubricant along the shaft 40.

Threaded into the bore 8 at the free end of the casing section 1 is a plug 48 which retains the plunger bushing 16 in its position in the bore 8 and which is provided with a central opening having a portion thereof shaped to provide a seat for the check valve 50. The plug 48 above the valve 50 is bored to receive a coupling member 52 having a central opening which communicates with a chamber above the valve 50 and is enlarged immediately above the valve 50 to receive a spring 54 which returns the check valve 50 to its seat. A second coupling member 56 cooperates with the coupling member 52 in securing the end of a pipe 58 which connects the individual plunger bore to a cylinder of the motor with which the pump is associated.

At the axis of the casing portion 1 and equidistant from all of the plunger bores is a bore having an inner portion forming a chamber 60 which is in communication through an opening 62 with a source of fuel supply. Above the chamber 60 the bore is of larger diameter and has seated therein a plug 64 which is held in position by a screw threaded plug 66. The plug 64 is provided with a plurality of passages 68 arranged on the circumference of a circle and communicating at one end with the chamber 60 and at the other end with a chamber 70 formed between the plug 64 and the plug 66. Centrally located in the plug 64 is a tapered bore which communicates at its upper end with the chamber 70 and at its lower end with the ports or passages 72 extending radially through the plug 64 and the body portion of the casing 1 to communicate with the bores of the plunger bushings 16 through grooves 74 formed in the bushing 16. In the tapered opening in the plug 64 is a tapered valve 75 having a cylindrical stem which is slidably mounted in an opening in the plug 66. The valve 75 is provided at its outer end with a head 76 which forms a seat for a spring 78 confined between the head 76 and a shoulder on the plug 66. The spring 78 tends to raise the valve 75 in the tapered opening in the plug 64. Ports or passages 80 extending radially from the chamber 60 communicate with grooves 82 in the bushings 16 and an axial port or passage 84 in each plunger 20 extends from the end of the plunger 20 to a transverse port or passage 86.

To control the fuel supplied to the engine cylinders by the pump the valve 75 is controlled by a governor 88 which may be of the usual ball type and which operates through lever 90 and links 92 to operate a lever 94 pivotally mounted as at 96 in a bracket 98 secured in the free end of the casing portion 1. The lever 94 has a bearing portion 99 which bears on the head 76 of the valve 75 so that operation of the governor will cause movement of the valve to restrict or enlarge the passage between the tapered valve 75 and the wall of the tapered port in which it is mounted so as to vary the supply of fuel therethrough. The governor 88 is arranged so that as the speed of the engine increases the lever 94 is operated to bear down upon the head 76 of the valve forcing the valve 75 closer to its seat against the action of spring 78 so as to restrict the flow of fuel to the bores in which the pump plungers 20 operate. The governor 88 is driven through a shaft 100 on which is fixed a gear 102 which meshes with the gear 38, the shaft 100 and gear 102 being mounted in a casing 104 having a seat which fits one of a plurality of pads 106 formed on the casing portion 4, which pads surround openings through which the gear 38 is accessible. The pads 106 permit of the attachment to the casing portion 4 of various accessories used in connection with the injection pump such as the fuel transfer pump and the fuel filter.

In the construction just described rotation of the cam 36 by the shaft 40 causes the cam 36 to engage the rollers 30 in succession and operate the followers 10 and the plungers 20, shifting each follower 10 and plunger 20 between the position shown at the left-hand side of Figure 3 and the position shown at the right-hand side of Figure 3. The rate at which the plungers are operated and the time during which they remain in the different positions will be determined by the contour of the cam 36. As shown, the cam 36 retains each plunger 20 in position to maintain the ports 72 closed as shown at the right-hand side of Figure 3 throughout the time in which all the other plungers 20 are being operated, lowering each plunger to the position shown at the left-hand side of Figure 3 only when it is desired to fill the chamber above the plunger 20 with fuel for the engine cylinder. With a plunger 20 raised, as shown at the right-hand side of Figure 3, movement of the cam 36 past its roller 30 permits the plunger 20 to be moved to its lower or retracted position by the spring 28 and a partial vacuum to be established above the plunger 20 so that upon the opening of the port 72 by movement of the plunger past the groove 74 fuel is drawn from the fuel chamber 60 through the ports 68 in the plug 64, chamber 70, past valve 75 and through the passages 72 into the chamber formed by the bore in bushing 16 above the plunger 20. Further movement of the cam 36 causes the cam to raise the follower 10 and the plunger 20 causing the plunger 20 to seal the passage 72 and to place the fuel in the chamber above the plunger under pressure, forcing fuel past the check valve 50 and through the passage in the plug 52 and the pipe 58 to an engine cylinder.

In order that the fuel may be delivered to the engine cylinders in a finely atomized condition it is customary to place in the delivery nozzles spring-biased valves which open only at a high pressure so that as the plunger 20 forces the fuel past the check valve 50 the fuel is under a high degree of pressure. In order that the supply of fuel to an engine cylinder may be cut off sharply at the end of the injection stroke the ports or passages 84 and 86 are provided in the plunger 20. Throughout the movement of the plunger 20 the end of the passage 86 is sealed by the wall of the plunger bushing 16 until the plunger is raised to place the passage 86 in communication with the groove 82 whereupon fuel under pressure from above the plunger 20 is vented through the passages 84 and 86, groove 82 and passage 80 to the fuel chamber 60 thus releasing suddenly the pressure above the plunger 20 and causing the valve in the delivery nozzle to cut off the supply to the engine cylinder sharply. Valve 50 seats immediately upon the fall of the pressure above the plunger 20 and prevents back flow of fuel from the pipe 58.

As the relative positions of the ports 86 and grooves 82 are determined and fixed the point at which the fuel injection to the cylinder is cut off remains fixed. The point at which the fuel injection starts will vary to some extent with the amount of fuel supplied to the engine cylinders at each operation of the pump, thus, when the valve 75 is opened to a greater extent the chambers above the plungers 20 will receive larger quantities of fuel than when the valve 75 is more nearly closed and with larger quantities of fuel in the chambers above the plungers the pressure on the fuel is raised to the point at which discharge to the engine cylinder starts upon a shorter movement of the plunger, thus the discharge starts earlier with a larger than with a smaller quantity of fuel. Both the time of beginning and the time of ending the injection of the fuel may be advanced or retarded simultaneously by rotating the casing with respect to the bracket 41. As the casing is rotated the cam 36, because of the connection by which it is driven from the engine, remains relatively fixed so that rotation of the casing varies the time relation of the operation of the pump plungers with respect to the operation of the engine pistons and makes the same adjustment simultaneously with respect to the pump plungers for all the engine cylinders.

Figure 7:
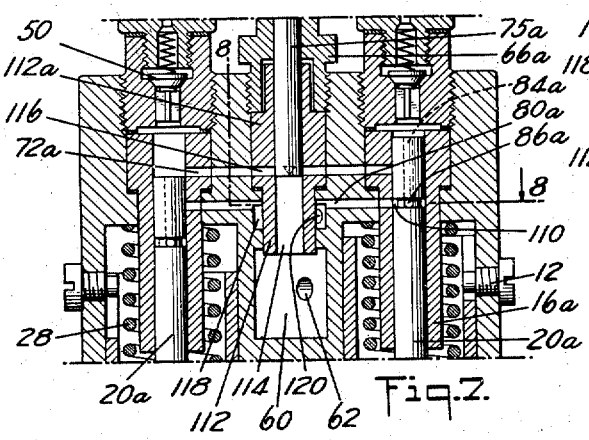
Fig. 7 is a partial view in vertical section taken similarly to Fig. 3 of a fuel injection pump of modified construction.
Figure 8:
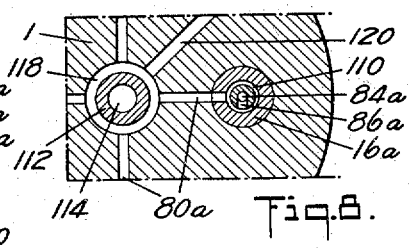
Fig. 8 is a fragmentary view in horizontal section taken as on line 8—8 of Fig. 7.
Figure 9:
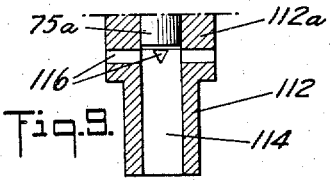
Fig. 9 is a fragmentary view in vertical section of the fuel control valve shown in Fig. 7, the valve being raised from its position in Fig. 7.
Figure 11:
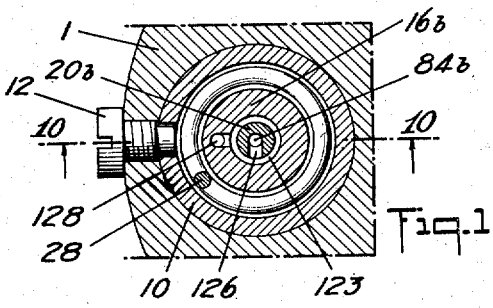
Fig. 11 is a fragmentary view in horizontal section taken as on line 11—11 of Fig. 10.
Figure 13:
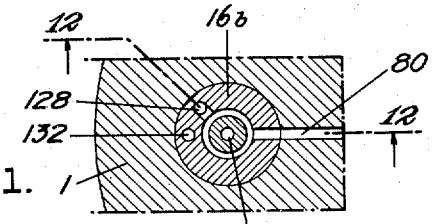
Fig. 13 is a fragmentary view in horizontal section taken as on line 13—13 of Fig. 12.
Figure 10:
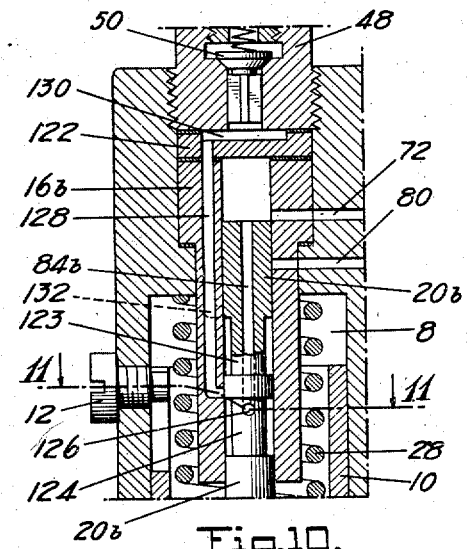
Fig. 10 is a fragmentary view in vertical section taken as on line 10—10 of Fig. 11 and showing an injection plunger and its casing of modified construction.
Figure 12:
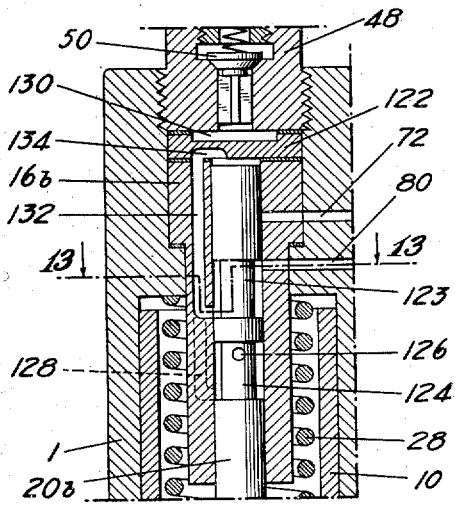
Fig. 12 is a fragmentary view in vertical section of the structure shown in Fig. 10, taken as on line 12—12 of Fig. 13 so as to show other portions of the structure and with the injection plunger raised to its uppermost position.

In the modification shown in Figures 7, 8 and 9 the fuel plungers 20ᵃ are mounted and operated in the same manner as the plungers 20 of the previous modification but the operating cam need not have the same contour as cam 36 of Fig. 3. Each plunger 20ᵃ, however, is provided with a groove 110 which communicates through radially extending ports or passages 86ᵃ with a longitudinally extending port 84ᵃ. The casing portion 1 is provided with an axially positioned bore having therein a plug formed of a lower or inner portion 112 and a separate upper or outer portion 112ᵃ, both portions being held in position by a plug 66ᵃ. The lower portion 112 of the plug has a central bore 114 which communicates with the chamber 60 formed by the lower portion of the bore of the casing 1 and with angularly shaped grooves 116 formed in the upper face of the portion 112 of the plug, the upper portion 112ᵃ of the plug closing the upper edges of the grooves so as to make closed triangularly shaped passages 116 which communicate with the ports or passages 72ᵃ leading to the bores for the plungers 20ᵃ. The plug portion 112ᵃ has a bore which forms a continuation of the bore 114 and mounted therein is a cylindrical valve 75ᵃ which may be operated in the same manner as the valve 75 of the previous modification. The lower or inner end of the valve 75ᵃ is flat so as to form a sharp cut-off for the triangular passages 116. It will be noted that the passages 116 have the narrowest portion thereof at the bottom and that the operation of the valve 75ᵃ is the same as the operation of the valve 75 of the previous modification, that is, movement of the valve 75ᵃ in a downward direction cuts off the supply of fuel to the chambers above the pump plungers 20ᵃ, the tapering of the passages 116 serving to give a very fine graduation as the valve cuts off but the valve 75ᵃ controls the ports 116 individually instead of controlling a common port as does valve 75 of the previous modification. In this modification ports or passages 80ᵃ establish communication from ports in the plunger bushings 16ᵃ to a fuel chamber 118 which, as shown, is in communication through a port 120 with the fuel supply, but the chamber 118 may, if desired, be extended downwardly so as to connect with the chamber 60 which is in communication through the port 62 with the fuel supply as in the previous modification. In this modification as a plunger 20ᵃ is forced downwardly by its spring 28 fuel is drawn from the chamber 60 through the passage 114, past the valve 75ᵃ and through a port 16 to the chamber above the plunger 20ᵃ. Movement of the plunger upwardly by the cam forces the fuel past the check valve 50 to the engine cylinder, ports 84ᵃ and 86ᵃ being closed by the bushing wall, until the groove 110 in the plunger 20ᵃ is connected to the passage 80ᵃ whereupon pressure above the plunger 20ᵃ is vented through the ports 84ᵃ, 86ᵃ, groove 110 and passage 80ᵃ to the chamber 118 whence it will pass through the passage 120 to the fuel supply or, if the connection be so made, to the chamber 60.

In the modification shown in Figures 10, 11, 12 and 13, the supply of fuel to the chamber above a pump plunger may be controlled by a valve, such as either of the valves 75, 75ᵃ, and the discharge from the chamber above that plunger may be either to a fuel supply chamber 60 or to a fuel chamber 118 as shown in the respective modifications. In this modification the upper portion of the plunger bushing 16ᵇ is spaced from the plug 48 and a washer 122 is placed between the plug 48 and the bushing 16b closing the direct passage from the chamber above the pump plunger 20b to the check valve 50. The pump plunger 20b is grooved as at 123 and 124 and from the groove 124 there extends a transverse port 126 which establishes communication from the groove 124 to the axial port or passage 84b. The bushing 16b is provided with a port or passage 128 which connects a chamber 130 below the valve 50 with the central bore of the bushing at a distance from the valve 50. The bushing 16b is also provided with a passage 132 which communicates with a port 134 formed in the washer 122 so as to establish communication from the chamber above the plunger 20b to the central bore of the bushing 16b at a distance from the washer 122. The plunger 20b when released by the cam and forced down by its spring 28 creates a partial vacuum above the plunger 20b and upon the opening of the port 72 by the plunger fuel is supplied to the chamber above the plunger. Upon operation of the plunger by the cam to force the fuel to the engine cylinder movement of the plunger first closes the passage 72 and continued movement thereafter forces the fuel above the plunger 20b through the passage 84b to the port 126 and groove 124. Groove 124 establishes communication with the passage 128 as the passage 72 is closed so that the fuel is forced from the chamber above the plunger 20b through the ports 84b, 126 and 128, chamber 130 and past check valve 50 to the engine cylinder. As the plunger 20b is raised the groove 123 of the plunger eventually establishes communication from the port 132 to the port 80 whereby fuel under pressure above the plunger 20b is vented through the ports 134 and 132 and the groove 123 of the plunger to port 80 and thence either to the supply chamber 60 or to the fuel chamber 118 according as port 80 is connected. In this modification vapor which passes to the chamber above the plunger 20b will rise above the fuel causing fuel only to be forced through ports 84b and 128 to the engine cylinder. The vapor is vented through ports 134 and 132 to the supply.

Figure 14:
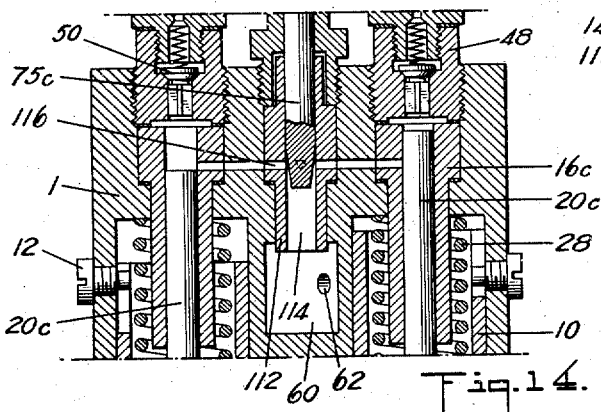
Figs. 14 and 15 are partial views in vertical section of further modifications.
Figure 16:
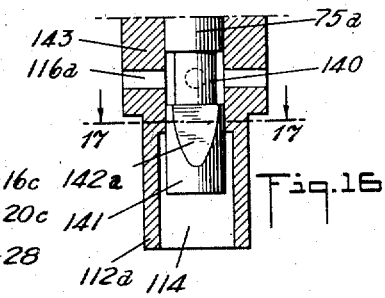
Fig. 16 is a fragmentary view in vertical section of the control valve shown in Fig. 15.
Figure 17:
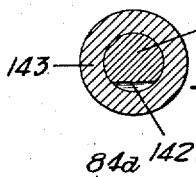
Fig. 17 is a fragmentary view in horizontal section taken as on line 17—17 of Fig. 16.

In the modification shown in Figure 14 the plungers 20c are formed as plain cylindrical plungers without ports or passages and the fuel control valve 75c is formed with an end of frustro-conical shape and controls a plurality of passages 116 leading to the bores of the pump plungers. The passages 116 are of triangular shape as in Figure 7 and the fuel is supplied thereto from the fuel supply chamber 60 through the passage 114 in the lower portion 112 of the plug. The operation of the control valve 75c is the same as that of valve 75a of Fig. 7, the ports 116 being fully closed when the portion of the valve of full diameter is placed in position over the ports. The tapered portion of the valve 75c provides a gradual closing of the valve. Retracting the plungers 20c causes fuel to be supplied from the fuel supply chamber 60 to the chambers above the plungers and operation of the plungers to force the fuel to the engine cylinders cuts off the passages 116 and forces the fuel past the check valves 50 to the engine cylinders in the usual manner. In this construction it will be noted there are no ports provided for venting the pressure above the plungers 20c in order to give a sharp cut off of the supply of fuel to the engine cylinders. The cam for operating the plungers 20c may have any suitable contour.

Figure 2:
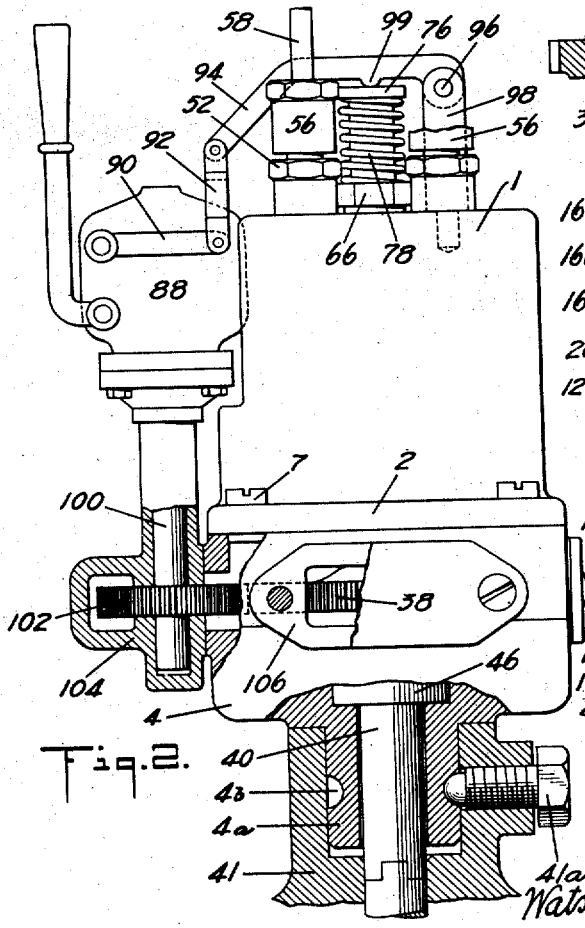
Fig. 2 is a view in side elevation of the fuel injection pump shown in Fig. 1, parts being broken away to show other parts more clearly.

In the modification shown in Figures 15, 16, 17 and 18 the fuel supply valve 75d is shown provided with a threaded stem engaging the plug 66d for manual adjustment of the valve although, of course, this valve may be arranged for adjustment by a governor as in Figure 2, if desired. The valve 75d is grooved as at 140 and its inner end portion 141 of full diameter is shaped to provide a flat inclined surface 142a on one side of the valve which cooperates with a shoulder in the valve chamber in controlling the passage of fuel through the port 114 in the plug 143. Controlling a port common to all the pump sections of the device prevents slight irregularities in the port sizes from affecting the amount of fuel supplied to the engine cylinders. The pump plungers 20d of this modification are grooved as at 142, 144, and have an axial port 84d and transverse ports 146 and 148 communicating with the grooves 144 and 142, respectively. In this construction the chamber 118d surrounding the plug 143 may be connected to the source of fuel supply through the port 120d and through ports 80d to the bores for the pump plungers 20d. The ports 116d connect the bores for the pump plungers to the bore or chamber in which the valve 75d is mounted. In the operation of this device when a plunger 20d is retracted fuel is supplied through port 120d, chamber 118d and port 80d to the pump plunger bore at the groove 144, thence through the transverse port 146 and the axial port 84d to the chamber above the pump plunger. The port 148 and the groove 142 of the pump plunger are at this time closed by the bushing 16d and the upper end portion of the plunger, which is of full diameter seals the port 116d. As the plunger is raised the port 80d is cut off and communication between the groove 144 of the plunger and the bore for the valve 75d is established through the port 116d so that as fuel is forced from the chamber above the plunger 20d past the check valve 50 to an engine cylinder, fuel is also permitted to pass through the port 84d and port 146 to the port 116d, past the inclined surface 142a of the valve 75d and through port 114 to the fuel chamber 60d which is in communication through the port 62 with the fuel supply.

As a pump plunger is raised to its uppermost position communication is established between the groove 142 on the pump plunger and port 80d leading to the chamber 118d so that as the plunger attains its uppermost position the pressure above the plunger is vented through the port 84d, port 148 and port 80d to chamber 118d, releasing the pressure above the pump plunger and cutting off the supply of fuel to the engine cylinder. During the first portion of the movement of the plunger from its uppermost position some fuel may be supplied to the chamber above the plunger from the fuel supply chamber 118d through the port 80d, port 148 and port 84d and also from the fuel chamber 60d past the valve 75d and through ports 116d, 146 and 84d. Port 80d, however, is cut off very shortly after movement of the plunger 20d starts and the port 116d is subsequently cut off and thereafter remains cut off, port 80d being reopened again upon movement of the plunger 20d to its lowermost position for the passage of fuel from the chamber 118d.

In this construction it will be noted that the fuel control valve 75d does not control the supply of fuel to the bore for the pump plunger but controls a by-pass or waste passage which vents a portion of the fuel from the bore for the pump plunger as the pump plunger is operated to force the fuel to the engine cylinder, the valve 75$^d$ serving to control this discharge from the bore for each pump plunger. In this modification, also, instead of having the pump plunger maintained at its uppermost position while each of the other pump plungers is operated the operating cam is so shaped that the pump plunger is returned to its lowermost position after each operation and remains in the lowermost position while each of the other pump plungers is operated. Thus, as each plunger 20$^d$ is on its delivery or outward stroke, the remaining plungers are positioned so that the ports 116$^d$ leading thereto are closed by the upper end portions of these plungers and the discharge of fuel except to the engine cylinder corresponding to the operating plunger or past valve 75$^d$ is prevented.

Figure 15:
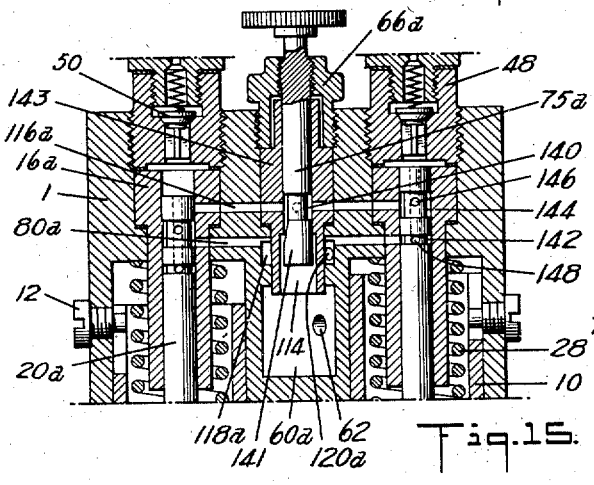
Figure 18:
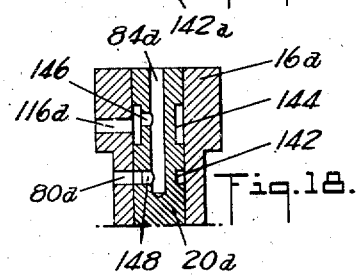
Fig. 18 is a fragmentary view in vertical section showing the upper portion of a fuel injection plunger of Fig. 15.
Figure 20:
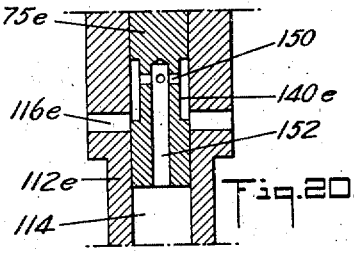
Fig. 20 is a fragmentary view in vertical section showing the fuel control valve of Fig. 19.
Figure 19:
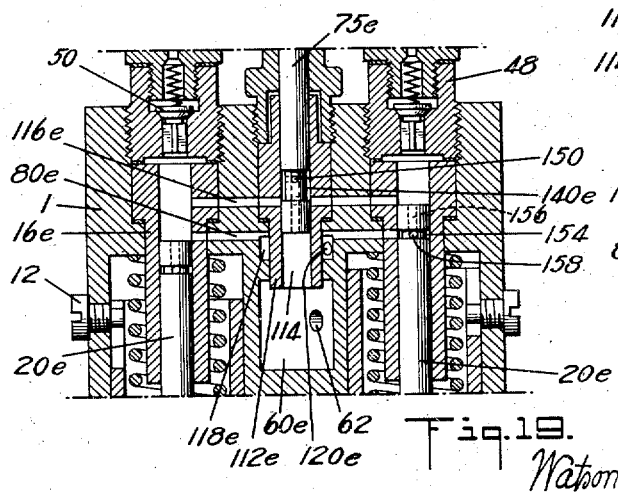
Fig. 19 is a partial view in vertical section of a further modification.
Figure 21:
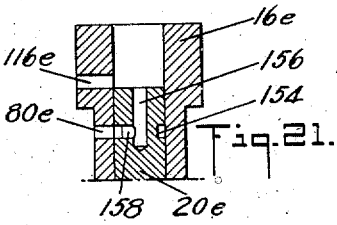
Fig. 21 is a fragmentary view in vertical section showing the upper portion of a fuel injection plunger of Fig. 19.

In the construction shown in Figures 19, 20 and 21 the fuel control valve 75$^e$ controls the passage of fuel through a waste passage from the bore of each of the pump plungers as in the modification shown in Fig. 15. The valve 75$^e$, however, differs from the valve 75$^d$ in having a groove, as at 140$^e$ which is in communication through transverse ports 150, an axial port 152 and bore 114 of the plug 112$^e$ with the chamber 60$^e$ so that the valve controls individual ports leading to the pump bores and not a port or passage common to all the pump sections as in the previous modification. In this modification, as in the previous modification, fuel is supplied through the port 120$^e$ to the chamber 118$^e$ and ports 80$^e$ to the bores above the pump plungers 20$^e$ and the waste from the pump plunger bores passes through passages 116$^e$ to the bore for the valve 75$^e$. The pump plungers 20$^e$ in this construction are each provided with a groove, as at 154 and an axial port 156 communicating through a transverse port 158 with the groove 154. The pump plunger 20$^e$ is made of such a length that at its uppermost position the upper end of the plunger does not cut off communication between the chamber above the pump plunger and the port 116$^e$. In the operation of this device retracting a pump plunger 20$^e$ creates a partial vacuum above the pump plunger which may cause some fuel to be supplied from the chamber 60$^e$ past the valve 75$^e$ and through the port 116$^e$ to the chamber above the pump plunger but when the pump plunger is returned to its lowermost or retracted position fuel is supplied from the chamber 118$^e$ through the port 80$^e$ to the chamber above the pump plunger. As the pump plunger is moved upwardly the upper portion of the pump plunger cuts off communication through the port 80$^e$ and forces the fuel past the check valve 50 to the engine cylinder. The groove 154 of the pump plunger is sealed by the wall of the plunger bushing 16$^e$ until the plunger approaches its uppermost position when communication is established between the groove 154 and the port 80e thereby establishing communication from the chamber above the pump plunger through the ports 156, 158 and 80$^e$ to the chamber 118$^e$, venting the pressure above the pump plunger and cutting off the supply of fuel to the engine cylinder. As the pump plunger is moved upwardly, however, part of the fuel above the pump plunger passes through the port 116$^e$ to the groove 140$^e$ of the valve 75$^e$ and through the ports 150 and 152, to the fuel chamber 60$^e$, the extent of this waste or bleed from the pump plunger bore being determined by the position of the valve 75$^e$. The valve 75$^e$ may be adjusted either manually as in the modification shown in Figure 15 or by a suitable governor as shown in Figure 2 and the plunger 20$^e$ may be operated by a cam of any suitable contour.

Figure 22:
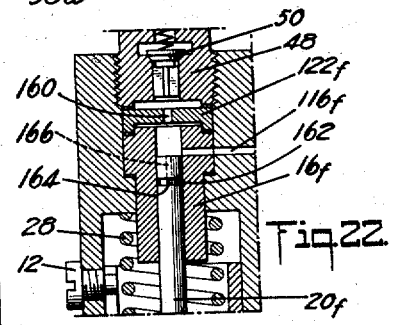
Figs. 22 and 23 are partial vertical sectional views showing further modifications.

In the modification shown in Fig. 22 a single port 116$^f$ connects the bore of the plunger bushing 16$^f$ with the fuel supply and a washer 122$^f$ having a port 160 is placed between the bushing 16$^f$ and the plug 48 which holds both washer and bushing in position. The plunger 20$^f$ is grooved as at 162 and a transverse port 164 establishes communication between the groove and an axial port 166 which extends to the upper face of the plunger 20$^f$. With the plunger 20$^f$ positioned as shown in Fig. 22 and fuel in the chamber above the plunger, operation of the plunger by the cam 36 raises the plunger to close the port 116$^f$ and force the fuel above the plunger to the engine cylinder. The discharge of fuel continues until the plunger approaches its extreme outer position where communication is established from the chamber at the outer end of the plunger through ports 166 and 164, groove 162 and port 116$^f$ whereby fuel under pressure is vented from the chamber to the fuel supply and the discharge to the engine cylinder is stopped. As the cam passes and the spring 28 returns the plunger to the position shown in Fig. 22, some fuel may pass from the fuel supply through port 116$^f$, groove 162 and ports 164 and 166 to the chamber above the plunger but the port 116$^f$ is almost immediately closed by the plunger and a partial vacuum is formed in the chamber above the plunger until the port 116$^f$ is again opened by the plunger 20$^f$ whereupon fuel flows through the port 116$^f$ from the fuel supply.

Figure 23:
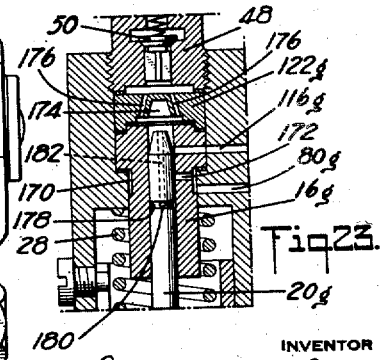

In the modification shown in Fig. 23, a port 116$^g$ connects the fuel supply to the bore of the plunger bushing 16$^g$ while a port 80$^g$ establishes communication from a fuel chamber with a groove 170 in the outer face of the bushing 16$^g$ which is connected by a port 172 with the bore in which the plunger is reciprocated. A washer 122$^g$ placed between the bushing 16$^g$ and the plug 48 and held in position by the plug is provided with a tapered recess 174 which is open towards the bore of the bushing 16$^g$ and with a plurality of ports 176 arranged in a circle about the recess 174. The plunger 20$^g$ has its upper or outer end tapered to enter the tapered recess 174 and is grooved as at 178. A transverse port 180 connects the groove 178 with an axial port 182 which extends to the outer end of the plunger. With the plunger 20$^g$ in its retracted position as shown in Fig. 23 and fuel in the chamber above the plunger operation of the plunger by a cam 36 shifts the plunger to close the port 116$^g$ and to force the fuel through the ports 176 in the plug 122$^g$ and past the check valve 50 to the engine cylinder until the movement of the plunger causes the groove 178 to register with the port 172 and open a passage for venting fuel under pressure from the chamber above the plunger through ports 182 and 180, groove 178, port 172, groove 170 and port 80$^g$ to the fuel chamber whereby the discharge of fuel to the engine cylinder is stopped.

In this modification, such gas or vapor as passes to or forms in the chamber above the pump plunger 20$^g$ tends to collect in the recess 174 in the washer 122$^g$ and as the plunger is raised such gas will be held in the recess 174 while liquid fuel is forced through the ports 176. When the groove 178 is connected to the port 172 the gas held in the recess is thereupon vented to the fuel chamber so that little or no gas or vapor is supplied to the discharge nozzles by the plungers 20g. As the operation of the cam permits the spring 28 to retract the cam some fuel may be supplied from the fuel chamber to the chamber above the plunger through ports 80g and 172 but the movement of the plunger soon closes the port 172 whereupon a partial vacuum is formed in the chamber above the plunger until the movement of the plunger uncovers the port 116g and fuel is supplied through this port from the fuel supply.

In this modification the ports 116g and 80g correspond to the ports 116 and 80a, respectively, of the structure shown in Fig. 7. Port 116g may be controlled as is port 116 and port 80g may be connected to the fuel supply as is port 80a. The cams 36 operating the plungers of Figs. 22 and 23 may be of any desired contour.

It will be noted that the above description of the structure of the invention with reference to the drawings begins with a description of a casing structure common to many modifications and that like or similar numerals refer to like parts throughout. Many of the modifications relate to the structure of the bushings that may be alternatively mounted in the pump plunger bores and the pump plungers that may be associated therewith, and to the bushings that may be alternatively mounted in the axial bore to provide a valve chamber and the valve plungers that may be associated therewith. The common casing structure is of simple construction standardized in production for economy and various modified forms of bushings are removably mounted therein to receive various pump plunger and valve plunger structures to provide pump structures capable of differing operations as may be desired whereby control of fuel forced to engine cylinders may be controlled by throttling by means of the valve manually or governor controlled, or by bleeding off fuel from the pump plunger bores, or by both.

Figure 24:
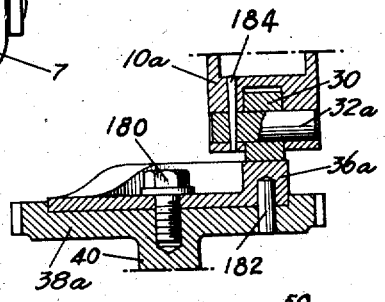
Fig. 24 is a fragmentary view, partly in vertical section showing, detached from the casing, an operating cam and cam follower for the fuel injection plunger of modified construction.

While in the construction shown in Figure 3 the cam 36 has been shown as formed integral with the gear wheel 38 it need not be so as the cam may be formed as a separate member, as the cam 36a of Figure 24, which is secured to the gear wheel 38a by a bolt 180, the cam being positioned with respect to the gear wheel by a dowel pin 182. Figure 24 also shows the pin 32a which supports the roller 30 in the piston plunger follower 10a secured therein by a tapered pin 184 in place of the spring wire 34, as shown in Fig. 3.

What is claimed is:

1. A fuel injection pump for internal combustion engines comprising a sectional casing having a plurality of plunger bores uniformly spaced in a circle about an axis of said casing and a sectional bushing in said casing forming a cylindrical valve chamber disposed on said axis of said casing and triangular ports at the meeting surfaces of said bushing sections connecting said valve chamber to said bores, pump plungers in said bores for forcing fuel from said bores to the cylinders of an engine, means for operating said plungers, means for venting fuel from the plunger bores to said ports for cutting off the flow of fuel from said plunger bores to the engine cylinders at a fixed point in the movement of said plungers and a cylindrical control valve in said valve chamber having a flat end controlling said ports to govern the amount of fuel supplied to the pump plunger bores.

2. In a fuel injection pump for internal combustion engines, a casing having a plurality of plunger bores uniformly spaced in a circle about an axis of said casing, a sectional bushing in said casing forming a cylindrical valve chamber disposed on said axis of said casing and having triangularly-shaped connections individual to said bores at the meeting surfaces of the bushing sections, pump plungers in said bores for forcing fuel from said bores to the cylinders of an engine, means for operating said plungers, said plungers having ports for venting fuel from the plunger bores to said valve chamber connections at fixed points in the movement of said plungers and an adjustable cylindrical valve plunger in said valve chamber for controlling the supply of fuel to the plunger bores individually, said valve plunger having a flat end arranged to simultaneously control all fuel passages.

3. A fuel injection pump for internal combustion engines comprising, a casing having an axial bore and a plurality of pump plunger bores disposed about said axial bore equidistant therefrom, a sectional bushing in said axial bore forming a substantially cylindrical valve chamber to be connected to a fuel supply, said bushing having triangular ports at the meeting surfaces of the sections thereof and said casing having a plurality of passages connecting each of said pump plunger bores to said valve chamber through the ports, pump plungers in said pump plunger bores for forcing fuel therefrom to engine cylinders, means for operating said plungers, means for venting fuel from said pump plunger bores to fuel supply for cutting off the flow of fuel from said pump plunger bores to the engine cylinders at a fixed point in the movement of each of said plungers, and a flat-ended cylindrical control valve in said valve chamber for controlling said ports to govern the amount of fuel supplied to the engine cylinders by said pump plungers.

4. In a fuel injection pump for internal combustion engines, the combination comprising a casing having an axial bore and a plurality of uniformly spaced pump plunger bores disposed about said axial bore equidistant therefrom, a sectional bushing in said axial bore forming a substantially cylindrical valve chamber to be connected to a fuel supply, said casing having connections from said valve chamber individually to said pump plunger bores terminating in triangular-shaped ports at the meeting surfaces of the sections of said bushing, pump plungers in said pump plunger bores for forcing fuel from said pump plunger bores to engine cylinders, means for operating said plungers, said plungers having ports for venting fuel from the pump plunger bores to fuel supply at fixed points in the movement of said plungers, and an adjustable flat-ended cylindrical valve plunger for individually and simultaneously controlling the supply of fuel through the ports to said pump plunger bores.

5. A fuel injection pump for internal combustion engines comprising, in combination, a standardized casing having an axial bore and a plurality of pump plunger bores disposed about said axial bore with their axes substantially parallel to the axis of said axial bore, said casing being provided with a plurality of fuel passages associated with said pump plunger bores to connect the same to said axial bore and afford ingress and egress of fuel therefor, fuel supply means including a passage in said casing communicating with said axial bore, a plurality of pump plungers one of which is reciprocatively mounted in each of said pump plunger bores for forcing fuel to engine cylinders, said plungers having ports for venting fuel from the pump plunger bores to said fuel supply means through at least some of the fuel passages, engine actuated means for operating said pump plungers in a desired sequence, a bushing secured in said axial bore and provided axially outward of the communication between fuel supply passage and the axial bore with ports arranged to communicate with at least some of said fuel passages, and a valve movably mounted in said bushing for controlling and varying the volume of fuel supplied to the engine cylinders through last-mentioned ports and passages.

6. A fuel injection pump for internal combustion engines comprising, in combination, a standardized casing having an axial bore and a plurality of pump plunger bores disposed about said axial bore with their axes substantially parallel to the axis of said axial bore, said casing being provided with sets of passages one of which is associated with each of said pump plunger bores to connect the same to said axial bore and afford ingress and egress of fuel therefor, fuel supply means including a passage in said casing communicating with said axial bore, a plurality of pump plungers one of which is reciprocatively mounted in each of said pump plunger bores for forcing fuel to engine cylinders, engine actuated means for operating said pump plungers in a desired sequence, a bushing secured in said axial bore and provided with ports arranged to communicate with a group of fuel passages comprising a fuel passage selected from each of said sets, the arrangement being such that the remaining fuel passages are free of control within the axial bore, and a valve movably mounted in said bushing for controlling and varying the volume of fuel supplied to the engine cylinders through said ports and the associated group of passages.

7. A fuel injection pump for internal combustion engines comprising, in combination, a standardized casing having an axial bore and a plurality of pump plunger bores disposed about said axial bore with their axes substantially parallel to the axis of said axial bore, said casing being provided with sets of passages one of which is associated with each of said pump plunger bores to connect the same to said axial bore and afford ingress and egress of fuel therefor, fuel supply means including a passage in said casing communicating with said axial bore, a plurality of pump plungers one of which is reciprocatively mounted in each of said pump plunger bores for forcing fuel to engine cylinders, engine actuated means for operating said pump plungers in a desired sequence, a bushing secured in said axial bore and provided with ports arranged to communicate with a group of fuel passages comprising a fuel passage selected from each of said sets, said plungers having ports for venting fuel from the pump plunger bores to said fuel supply means through the remaining fuel passages and a valve movably mounted in said bushing for controlling and varying the volume of fuel supplied to the engine cylinders through said ports and the associated group of passages.

EVERETT M. PURDY.